(12) United States Patent
Berger et al.

(10) Patent No.: US 6,516,770 B1
(45) Date of Patent: Feb. 11, 2003

(54) BALANCE SHAFT AND ALTERNATOR ASSEMBLY FOR AN AUTOMOTIVE VEHICLE

(75) Inventors: Alvin Henry Berger, Brownstown, MI (US); James Ryland Clarke, Northville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 110 days.

(21) Appl. No.: 09/670,950

(22) Filed: Sep. 27, 2000

(51) Int. Cl.[7] ............................................... F02B 75/06
(52) U.S. Cl. ..................................................... 123/192.1
(58) Field of Search ........................... 123/192.1, 192.2, 123/599; 310/51, 263

(56) References Cited

U.S. PATENT DOCUMENTS

| | | | | |
|---|---|---|---|---|
| 4,849,665 A | * | 7/1989 | Kitamura et al. | 123/195 E |
| 5,203,293 A | * | 4/1993 | Shintani et al. | 123/198 R |
| 5,375,571 A | * | 12/1994 | Diehl et al. | 123/192.2 |
| 5,469,820 A | * | 11/1995 | Data et al. | 123/192.2 |
| 5,543,676 A | | 8/1996 | York et al. | |
| 5,887,576 A | * | 3/1999 | Wheeler et al. | 123/559.1 |
| 6,114,793 A | * | 9/2000 | Asao et al. | 310/51 |

FOREIGN PATENT DOCUMENTS

| | | |
|---|---|---|
| GB | 1095012 | 3/1965 |
| JP | 52022608 A | 2/1977 |
| JP | 4102744 A | 4/1992 |
| WO | WO 95/02758 | 1/1995 |

* cited by examiner

Primary Examiner—Henry C. Yuen
Assistant Examiner—Hyder Ali
(74) Attorney, Agent, or Firm—Allan J. Lippa

(57) ABSTRACT

An engine block 10 of an engine 11 has an imbalance therein. The engine 11 is balanced by a balance shaft alternator assembly 20 having a balance shaft 24 that rotates synchronously with the crankshaft. The balance shaft 24 is located at an exterior portion 22 of engine block 10. The balance shaft 24 has a rotor 36 that rotates relative to a stator 42 held in a fixed position relative to engine block 10 and balance shaft 24. Weights 50 may be applied to the balance shaft alternator assembly on balance shaft 24 or on rotor 36 or a combination of the two. The weights 50 balance an imbalance in the engine to smooth out the operating feel of the engine.

17 Claims, 2 Drawing Sheets

BALANCE SHAFT AND ALTERNATOR ASSEMBLY FOR AN AUTOMOTIVE VEHICLE

TECHNICAL FIELD

The present invention relates generally to engines for automotive vehicles, and more particularly, to engines having balance shafts that function as a portion of an alternator.

BACKGROUND

Alternators are typically mounted on the exterior of an engine and are belt-driven with an accessory belt used to drive various ancillary under hood components that are mounted to the engine. The alternator and the ancillary components occupy much sought after space in the engine compartment. In some cases, it is nearly impossible to provide certain engines for certain vehicles because of the space occupied by the ancillary components. It would therefore be desirable to reduce package space of an engine and the ancillary items.

Engines, particularly 60 degree "V" angle V-6 engines, use balance shafts to achieve optimal smoothness during engine operation. Typical balance shafts are located within the crankcase of the engine. The balance shaft counteracts imbalance generated by the reciprocating motion of the masses within the cylinder bores of the engine. When the engine acts in an imbalanced manner, the roughness of the engine may be observed by the operator of the vehicle. It is therefore desirable to provide balance shafts for engines to counteract imbalance.

SUMMARY OF THE INVENTION

It is therefore one object of the invention to provide a balance shaft and alternator assembly to reduce package space occupied by the engine. Advantageously, it has been found that by moving the balance shaft from the crankcase environment, the balance shaft may be used to mount a rotor for an alternator within a housing on the exterior of the engine block which may house an alternator stator adjacent to the rotor.

It is therefore one object of the invention to provide an engine having an engine block having an interior portion and an exterior portion; a balance shaft alternator assembly is coupled to the exterior portion of the engine block. The assembly has a housing and a balance shaft rotatably coupled within the housing. The balance shaft is also rotatably coupled to the crankshaft. The housing has a stator fixedly coupled therein. The balance shaft has a rotor that is fixedly coupled thereto. The assembly has a stator adjacent to the rotor that generates electricity upon the rotation of the rotor.

In a further aspect of the invention, a method for generating electrical power and balancing the operator of an engine having an imbalance comprises the steps of:

synchronously coupling a balance shaft to a crankshaft, said balance shaft having a rotor directly coupled thereto;

generating a magnetic field from said rotor;

rotating said rotor adjacent to a stator;

inducing electrical current flow in the stator from the rotor; and, rotating said balance shaft assembly to counterbalance the imbalance of the engine.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
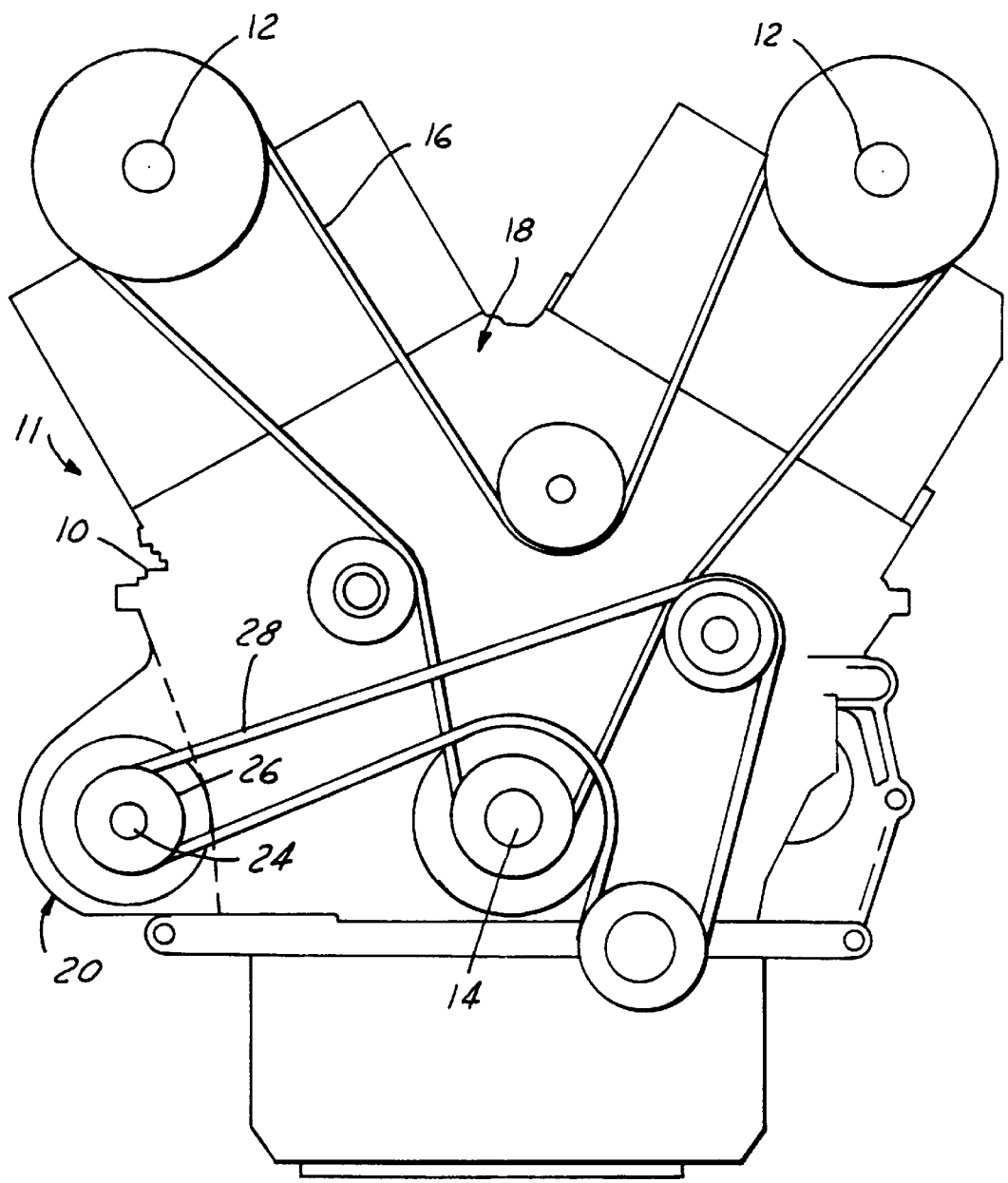
FIG. 1 is a partial cutaway view of an engine having a balance shaft alternator according to the present invention.

In the following figures the same reference numerals will be used to identify the same components in the various views. Although specific embodiments of the invention are illustrated, various configurations would be evident from the teachings according to the present invention.

Referring now to FIG. 1, an engine block 10 of an engine 11 is illustrated having a pair of camshafts 12 and a crankshaft 14. The pistons (not shown) are coupled to crankshaft 14 in a conventional manner. The rotation of crankshaft 14 drives the camshafts 12 through a timing belt 16. Camshafts 12 and crankshaft 14 are located within an interior portion 18 of engine block 10. A balance shaft alternator assembly 20 is located on an exterior portion 22.

Balance shaft alternator assembly 20 has a shaft 24 having a drive means such as a cog toothed sprocket 26 thereon. A cog tooth belt 28 is used to drive cog tooth sprocket 26 synchronously with crankshaft 14.

Balance shaft alternator assembly 20 has a housing or partial housing 30 therearound to secure balance shaft alternator assembly 20 to engine block 10. Balance shaft alternator assembly 20 is preferably used to balance any imbalance during the operation of engine 11.

Figure 2:
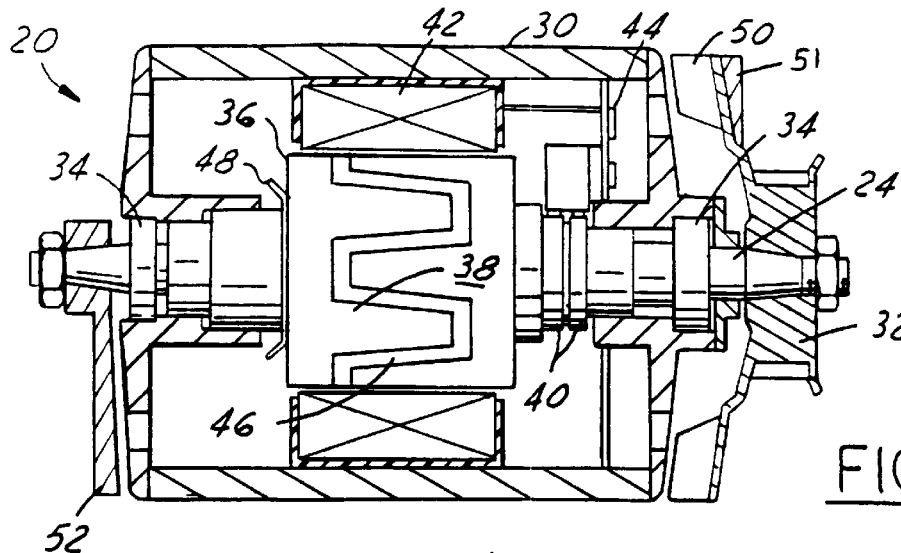
FIG. 2 is a cross-sectional view of a first embodiment of a balance shaft alternator assembly according to the present invention.

Referring now to FIG. 2, a cross-sectional view of a first embodiment of a balance shaft alternator assembly 20 is illustrated. Shaft 24 has a cog toothed sprocket 32 fixedly coupled thereto. Cog toothed sprocket 32 is coupled to cog tooth belt 28 shown in FIG. 1. As cog tooth belt 28 rotates due to the rotation of crankshaft 14, cog toothed sprocket 32 rotates balance shaft 24.

Balance shaft 24 is rotatably coupled within housing 30 and is supported within housing 30 by bearings 34. Although bearings 34 are illustrated coupling housing with balance shaft 24, a portion of engine block 10 may be shaped to support balance shaft 24 using bearings 34.

Balance shaft 24 has a rotor 36 fixedly coupled thereto. Rotor 36 is illustrated as a claw-pole Lundel type rotor having opposing claw-pole fingers 38. Although not illustrated, a field coil is positioned within claw-pole fingers 38 in a conventional manner. The field coil is electrically coupled to a pair of parallel spaced apart slip rings 40. Slip rings 40 provide an electrical connection to a power source as will be further described below. Thus, slip rings 40 and rotor 36 including claw-pole fingers 38 rotate as balance shaft 24 rotates.

A stationary stator 42 is positioned within housing 30. Stator 42 is positioned adjacent to rotor 36 so that as the rotor 36 rotates, the changing magnetic field induces current flow within stator 42. Stator 42 has a plurality of windings and laminations wound in a conventional manner.

Housing 30 preferably has an electronic circuit 44 positioned near the end thereof. Electronic circuit 44 preferably comprises a rectifier assembly for rectifying the AC output of stator 42 into a DC output for powering the electrical components of the vehicle and charging the vehicle battery.

To improve the amount of electrical current induced in stator 42, rotor 36 may have permanent magnets 46 positioned between claw-pole fingers 38. This is particularly important since in the preferred embodiment, the alternator may turn at a slower speed than those normally used in alternators. The speed may be dictated by the balance shaft function. Also, to improve efficiency and cool the balance shaft alternator assembly 20, rotor 36 may have a fan 48 positioned adjacent to claw-pole fingers 38. Of course, those skilled in the art will recognize that a second fan 48 may be positioned on the opposite end of rotor as the illustrated fan 48.

A fan 50 having a weight 51 is rotatably coupled to balance shaft 24. Weight 51 may also be referred to those in the art as an unbalanced weight. Weight 51 is positioned to counterbalance an imbalance acting on crankshaft 14. The amount of weight and the position of the weight in an axial direction may vary depending on the characteristics of the particular engine to which it is coupled. A second weight 52 may also be added diametrically opposed to weight 50 to provide further balancing.

Figure 3:
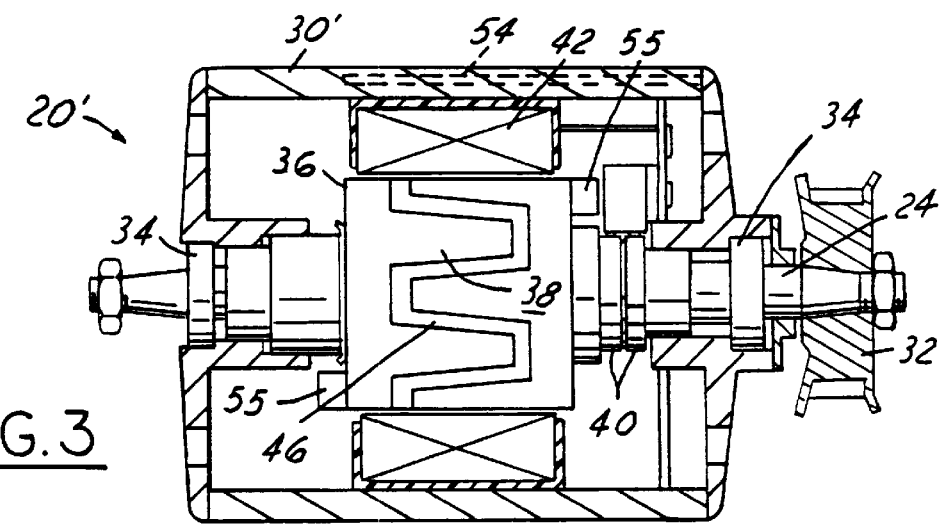
FIG. 3 is a cross-sectional view of a second embodiment of a balance shaft assembly according to the present invention.

Referring now to FIG. 3, a similar embodiment of balance shaft alternator assembly 20' is illustrated similar to that of FIG. 2. Common components from FIG. 2 are illustrated with the same reference numerals. Components that have been modified will be illustrated with a prime. Housing 30' has been modified to provide liquid cooling through channels 54. Liquid cooling may be performed by the engine coolant serially directed from the radiator through the housing 54 before entering the engine. The coolant loop within housing 54 may also be in parallel to the engine coolant loop. In this case, fans 48 have been eliminated since the alternator may rely upon liquid cooling alone.

In FIG. 3, only two weights 55 are illustrated coupled to rotor 36. Weights 55 are external to rotor 36 and are diametrically opposed.

Figure 4:
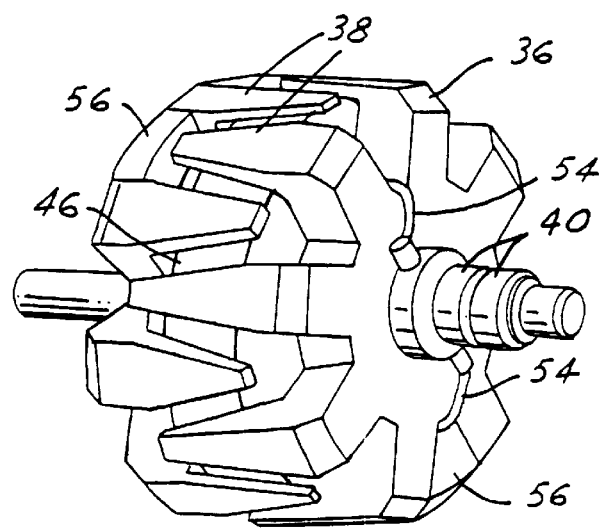
FIG. 4 is a perspective view of a rotor assembly for a balance shaft alternator assembly according to the present invention.

Referring now to FIG. 4, a rotor suitable for use in FIGS. 2 and 3 is illustrated. Rotor 36 has claw-pole fingers 38 as described above. As shown, permanent magnets 46 may be positioned between adjacent pole fingers 38. Wires 54 are used to couple electricity to field windings (not shown) within claw-pole fingers 38.

To provide further balancing, a weight or a number of weights 56 may be coupled to rotor 36 between claw-pole fingers. Weights 56 may be unevenly distributed to provide balancing to perform part or all of the balance shaft function.

In operation, the balance shaft and crankshaft are synchronously coupled. A rotor is provided on the balance shaft which is used to generate a magnetic field to induce current flow through the stator windings. The output of the stator is rectified in a manner familiar to those skilled in the art. Weights are provided on the rotating balance shaft assembly to counter an imbalance in the engine. As described above, the weights may be positioned in various places in combination or alone such as on the rotor, on the rotor shaft within the housing or external to the housing.

While particular embodiments of the invention have been shown and described, numerous variations and alternate embodiments will occur to those skilled in the art. Accordingly, it is intended that the invention be limited only in terms of the appended claims.

What is claimed is:

1. An engine comprising:
   an engine block having an interior portion and exterior portion, said engine block having a crankshaft therein;
   a balance shaft alternator assembly coupled to the exterior portion of the engine block, said assembly comprising;
   a housing;
   a balance shaft rotatably coupled within the housing and rotatably coupled to said crankshaft, said housing having a stator fixedly coupled thereto, said shaft having a rotor fixedly coupled thereto, said assembly having a stator adjacent to the rotor that induces current flow in the stator upon the rotation of the rotor;
   a plurality of weights coupled to said assembly for balancing an engine imbalance; and
   a drive having cog tooth sprockets and a cog tooth belt, said cog tooth belt coupling said cog toothed sprocket to said crankshaft.

2. An engine as recited in claim 1 further comprising a housing coupled to said assembly for enclosing said assembly to said engine block.

3. An engine as recited in claim 1 wherein said weights are directly affixed to said shaft.

4. An engine comprising:
   an engine block having an interior portion and exterior portion, said engine block having a crankshaft therein;
   a balance shaft alternator assembly coupled to the exterior portion of the engine block, said assembly comprising;
   a housing;
   a balance shaft rotatably coupled within the housing and rotatably coupled to said crankshaft, said housing having a stator fixedly coupled thereto, said shaft having a rotor fixedly coupled thereto, said assembly having a stator adjacent to the rotor that induces current flow in the stator upon the rotation of the rotor; and,
   a plurality of weights coupled to said rotor for balancing an engine imbalance.

5. An engine comprising,
   an engine block having an interior portion and exterior portion, said engine block having a crankshaft therein;
   a balance shaft alternator assembly coupled to the exterior portion of the engine block, said assembly comprising;
   a housing;
   a balance shaft rotatably coupled within the housing and rotatably coupled to said crankshaft, said housing having a stator fixedly coupled thereto, said shaft having a rotor fixedly coupled thereto, said assembly having a stator adjacent to the rotor that induces current flow in the stator upon the rotation of the rotor;
   a plurality of weights coupled to said assembly for balancing an engine imbalance, wherein at least one of said plurality of weights is coupled to said shaft and at least one of said plurality of weights are coupled to said rotor.

6. An engine comprising:
   an engine block having an interior portion and exterior portion, said engine block having a crankshaft therein;
   a balance shaft alternator assembly coupled to the exterior portion of the engine block, said assembly comprising;

a housing;

a balance shaft rotatably coupled within the housing and rotatably coupled to said crankshaft, said housing having a stator fixedly coupled thereto, said shaft having a rotor fixedly coupled thereto, said assembly having a stator adjacent to the rotor that induces current flow in the stator upon the rotation of the rotor, said rotor having a permanent magnet coupled between said pole fingers; and a plurality of weights coupled to said assembly for balancing an engine imbalance.

7. An engine as recited in claim 6 wherein said crankshaft and balance shaft rotate synchronously.

8. An engine as recited in claim 6 wherein said balance shaft is rotatably coupled to said engine block with bearings.

9. A balance shaft alternator assembly comprising:

a housing;

a balance shaft rotatably coupled within the housing and adapted to be coupled to a crankshaft, said housing having a stator fixedly coupled thereto, said shaft having a rotor fixedly coupled thereto, said assembly having a stator adjacent to the rotor that induces current flow in the stator upon the rotation of the rotor;

a plurality of weights coupled to said assembly for balancing an engine imbalance; and a drive having cog tooth sprockets and a cog tooth belt, said cog tooth belt coupling said cog toothed sprocket to said crankshaft.

10. An assembly as recited in claim 9 further comprising a housing coupled to said assembly for enclosing said assembly to said engine block.

11. An assembly as recited in claim 9 wherein said weights are directly affixed to said shaft.

12. A balance shaft alternator assembly comprising:

a housing;

a balance shaft rotatably coupled within the housing and adapted to be coupled to a crankshaft, said housing having a stator fixedly coupled thereto, said shaft having a rotor fixedly coupled thereto, said assembly having a stator adjacent to the rotor that induces current flow in the stator upon the rotation of the rotor; and, a plurality of weights coupled to said rotor for balancing an engine imbalance.

13. A balance shaft alternator assembly comprising:

a housing;

a balance shaft rotatably coupled within the housing and adapted to be coupled to a crankshaft, said housing having a stator fixedly coupled thereto, said shaft having a rotor fixedly coupled thereto, said assembly having a stator adjacent to the rotor that induces current flow in the stator upon the rotation of the rotor; and, a plurality of weights coupled to said assembly for balancing an engine imbalance, at least one of said plurality of weights being coupled to said shaft and at least one of said plurality of weights being coupled to said rotor.

14. A balance shaft alternator assembly comprising:

a housing;

a balance shaft rotatably coupled within the housing and adapted to be coupled to a crankshaft, said housing having a stator fixedly coupled thereto, said shaft having a rotor fixedly coupled thereto, said assembly having a stator adjacent to the rotor that induces current flow in the stator upon the rotation of the rotor, said rotor having a permanent magnet coupled between said pole fingers; and, a plurality of weights coupled to said assembly for balancing an engine imbalance.

15. A method for inducing current flow power and balancing the operation of an engine having an imbalance comprising the steps of:

synchronously coupling a balance shaft to a crankshaft, said balance shaft having a rotor directly coupled thereto:

generating a magnetic field from said rotor;

rotating said rotor adjacent to a stator;

inducing electrical current flow in the stator from the rotor; and, rotating said balance shaft assembly to counterbalance the imbalance of the engine by rotating a weight positioned between the pole fingers.

16. A method as recited in claim 15 wherein the step of rotating said balance shaft comprises the step of coupling a weight to the balance shaft.

17. A method for inducing current flow power and balancing the operation of an engine having an imbalance comprising the steps of:

synchronously coupling a balance shaft to a crankshaft, said balance shaft having a rotor directly coupled thereto;

generating a magnetic field from said rotor;

rotating said rotor adjacent to a stator;

inducing electrical current flow in the stator from the rotor; and, rotating said balance shaft assembly to counterbalance the imbalance of the engine by coupling a weight to said rotor.

* * * * *